(12) United States Patent
Palmute

(10) Patent No.: US 9,801,336 B2
(45) Date of Patent: Oct. 31, 2017

(54) FLOATING BASE-CUTTER ASSEMBLY FOR USE ON SUGAR-CANE HARVESTERS

(71) Applicant: Marchesan Implementos e Maquinas Agricolas Tatu S.A., Matao (BR)

(72) Inventor: Valter Palmute, Araras (BR)

(73) Assignee: Marchesan Implementos e Maquinas Agricolas Tatu S.A., Matao (BR)

( * ) Notice: Subject to any disclaimer, the term of this patent is extended or adjusted under 35 U.S.C. 154(b) by 0 days.

(21) Appl. No.: 15/124,157

(22) PCT Filed: Jan. 7, 2015

(86) PCT No.: PCT/BR2015/050001
§ 371 (c)(1),
(2) Date: Sep. 7, 2016

(87) PCT Pub. No.: WO2015/135049
PCT Pub. Date: Sep. 17, 2015

(65) Prior Publication Data
US 2017/0013775 A1 Jan. 19, 2017

(30) Foreign Application Priority Data

Mar. 13, 2014 (BR) ............................ 102014005970

(51) Int. Cl.
*A01D 41/14* (2006.01)
*A01D 46/08* (2006.01)
(Continued)

(52) U.S. Cl.
CPC ............. *A01D 34/54* (2013.01); *A01D 34/44* (2013.01); *A01D 34/60* (2013.01); *A01D 45/10* (2013.01); *A01D 2101/00* (2013.01)

(58) Field of Classification Search
CPC ...... A01D 41/141; A01D 46/08; A01D 45/10; A01D 34/006; A01D 41/145; Y10S 56/10; Y10S 56/15; Y10S 56/03
(Continued)

(56) References Cited

U.S. PATENT DOCUMENTS 3,163,974 A * 1/1965 Mack ................... A01D 41/141
56/10.2 E
3,548,570 A 12/1970 Knott et al.
(Continued)

FOREIGN PATENT DOCUMENTS

BR MU8600817 U 12/2007
WO WO 00/60921 A1 10/2000

OTHER PUBLICATIONS

Marchesan Implementos E Máquinas Agrícolas Tatu S.A., Applicant's Response to Jul. 1, 2015 Communication Pursuant to PCT Rule 46.5(b)(iii) and the International Searching Authority's Written Opinion of May 6, 2015 for International Application No. PCT/BR2015/050001, Jul. 21, 2015, 3 pages, Dannemann Siemen Bigler & Ipanema Moreira, Brazil.
(Continued)

*Primary Examiner* — Arpad Fabian-Kovacs
(74) *Attorney, Agent, or Firm* — Alston & Bird LLP

(57) ABSTRACT

Provided is a floating base-cutter assembly (16) for use on sugar-cane harvesters, the assembly being formed by two base-cutters. Each of the base-cutters (16) comprises a set of cutting knives (9). The base-cutter assembly (16) comprises an adjustable set of cutting knives (9) that may be selectively adjustable with respect to the ground. The base-cutter assembly (16) is also mounted on the harvester body via a set of articulated rods (2, 5). The base-cutter assembly (16) also includes an electric switch (7) and an inverted-shell-shaped component (8) that collectively control a hydraulic or pneumatic cylinder (4) to articulate the rods (2,5) and
(Continued)

maintain the set of cutting knives (9) at a redetermined distance relative to the ground surface, regardless of variations in the ground surface.

4 Claims, 2 Drawing Sheets

(51) Int. Cl.
    *A01D 75/28*     (2006.01)
    *A01D 34/54*     (2006.01)
    *A01D 45/10*     (2006.01)
    *A01D 34/44*     (2006.01)
    *A01D 34/60*     (2006.01)
    *A01D 101/00*     (2006.01)

(58) Field of Classification Search
    USPC ...................................................... 56/10.2 E
    See application file for complete search history.

(56) References Cited

U.S. PATENT DOCUMENTS

| | | | | |
|---|---|---|---|---|
| 3,886,718 A | * | 6/1975 | Talbot | A01D 41/141 56/10.2 E |
| 3,953,959 A | * | 5/1976 | Decruyenaere | A01D 41/141 56/208 |
| 4,211,057 A | * | 7/1980 | Dougherty | A01D 41/141 56/10.2 E |
| 4,332,126 A | * | 6/1982 | Van Auwelaer | A01D 41/141 56/10.2 R |
| 4,343,140 A | | 8/1982 | Hegger | |
| 5,090,184 A | * | 2/1992 | Garter | A01D 46/08 56/10.2 E |
| 5,115,628 A | * | 5/1992 | Garter | A01D 46/08 56/10.2 E |
| 5,138,819 A | | 8/1992 | André | |
| 6,289,659 B1 | * | 9/2001 | Fox | A01D 46/08 56/10.2 E |
| 6,530,197 B1 | * | 3/2003 | Christensen | A01D 41/141 172/4 |
| 6,588,187 B2 | * | 7/2003 | Engelstad | A01D 46/08 56/10.2 E |
| 6,826,894 B2 | * | 12/2004 | Thiemann | A01D 41/141 56/10.2 E |
| 7,401,455 B1 | * | 7/2008 | Cleodolphi | A01D 45/10 56/10.2 E |
| 2006/0242935 A1 | * | 11/2006 | Rayfield | A01D 41/141 56/10.2 E |
| 2008/0155953 A1 | | 7/2008 | Cleodolphi | |
| 2008/0264025 A1 | * | 10/2008 | Ditchcreek | A01D 41/141 56/10.2 E |
| 2010/0077712 A1 | * | 4/2010 | Nathan | A01D 41/141 56/10.2 E |
| 2011/0271653 A1 | * | 11/2011 | Vandeven | A01D 41/141 56/10.2 E |
| 2014/0041351 A1 | * | 2/2014 | Bollin | A01D 41/141 56/10.2 E |
| 2016/0135365 A1 | * | 5/2016 | Cleodolphi | A01D 34/006 56/10.2 E |

OTHER PUBLICATIONS

International Searching Authority, International Search Report and Written Opinion for International Application No. PCT/BR2015/050001, dated May 6, 2015, 11 pages, European Patent Office, Netherlands.

\* cited by examiner

FLOATING BASE-CUTTER ASSEMBLY FOR USE ON SUGAR-CANE HARVESTERS

CROSS REFERENCE TO RELATED APPLICATIONS

This application is a National Stage Application, filed under 35 U.S.C. §371, of International Application No. PCT/BR2015/050001, filed Jan. 7, 2015, which claims priority to Brazilian Application No. BR102014005970-9, filed Mar. 13, 2014; the contents of both of which as are hereby incorporated by reference in their entirety.

BACKGROUND

Related Field

The present invention relates to a floating base-cutter assembly for use on sugar-cane harvesters.

Description of Related Art

Base-cutters are composed by two discs provided with knives, positioned side by side and joined to an engaged drive box.

Base cutters are integral with the frame of the sugar-cane harvester, which is heavy and rigid and has the function of holding and driving the base-cutters.

The assembly formed by the base-cutters and harvester is extremely heavy and, due to this weight, its rapid movement to follow the alterations of the ground relief during the harvesting process is quite insufficient.

While harvesting, the harvester moves with a speed of about 4 km/h, while the ground, even duly prepared (systematized), exhibits unevenness that may not be neglected, chiefly when one seeks to cut the sugar-cane at close to the ground as possible. It in this situation that the prior art proves to be insufficient in the sense that it does not react rapidly to the ground oscillations, at the moment when the base-cutters cut the sugar-cane as close to the ground as possible.

This is because the oscillation movement of the base-cutter assembly takes place with the up-and-down movement of the whole harvester assembly and, in this regard, one observes the natural slowness of the hydraulic assemblies responsible for moving the tons of said harvester assembly, so that the reaction of the base-cutter to the typical imperfections of the ground is always delayed. This produces two undesired reactions: (a) the base cutters move away from the ideal cane cutting point with respect to the ground, or: (b) the base cutters go beyond the ideal cane cutting point with respect to the ground and end up allowing the cane cutting knives end to penetrate the ground.

The fact of enabling the sugar cutting knives to penetrate the soil brings a few undesirable consequences for the cane harvesting process. The first and most immediate drawback is the dragging of earth into the cane harvesting machine. The dragged earth will follow the cane, in part, as far as the processing sugar-cane grinders of the sugar-cane mill, with consequences of early wear of any mechanical assembly that is located in this space. The second drawback is the shake on the root system of the sugar stalk, the so-called clump of roots, the consequences of which will be felt on the harvester itself.

BRIEF SUMMARY

The present invention has the objective of improving the reaction of the base-cutters of a sugar-cane harvester to the roughness of the ground, so as to guarantee the sugar cutting at an ideal height, thus minimizing the problems encountered in the prior art.

The objective mentioned above is achieved by means of a floating base-cutter assembly for use on a sugar-cane harvester, the assembly being formed by two base-cutters, each of which comprising a set of cutting knives, the base-cutter assembly comprising primary adjustment of the distance of the cutting knives with respect to the ground, the base-cutter assembly being mounted on the harvester frame by means of a set of articulated rods, the base-cutter assembly comprising reading means for reading the variation of the ground surface, the reading means being capable of generating an electric signal for varying the distance of the set of cutting knives with respect to the ground.

According to the preferred embodiment of the invention, the means for reading variation of the ground surface comprise an inverted-shell shaped component that works close to the ground, said component being in electric contact with an electric switch.

The set of rots is articulable by action of a hydraulic/pneumatic cylinder. The hydraulic cylinder moves the set of rods, thus moving the set of cutting knives up and down, in response to the electric signal generated by the means for reading variation of the ground surface, such that the set of cutting knives will always be at a predetermined distance from the ground surface. The primary adjustment of distance of the cutting knives with respect to the ground is provided by means of a traction spring.

According to the invention, the assembly composed by the two base-cutters, which belong but are isolated from the harvester frame (interconnected by rods), float over the ground, being located as close to it as possible, touching it, without pressing it. In this way, the base-cutters perform the task of cutting sugar-cane in conditions as close as possible to the ideal conditions, since they react rapidly to the unevenness of the ground.

The effects achieved by the invention aggregate great value to the harvesting process, meeting the agronomic rules, wherein the cut close to the ground line generates less shake on the roots, and the fact that the knives do not adhere to the ground prevents dragging organic matter together with the canes.

Thus, when the sugar-cane cutting takes place close to the ground, the root system of the plant is not shaken, and the new sprouting (future crop) is not impaired. In the same way, when one causes the base-cutters to react more rapidly to the ground unevenness, one manages to prevent them from dragging earth together with the cut cane, which prevents greater damages to or early wear of the mechanical assemblies of the sugar-cane harvester, besides not carrying the weight of the earth into the processing unit.

BRIEF DESCRIPTION OF THE FIGURES

The invention will now be described in greater detail with reference to an example of embodiment of the invention. The figures show.

DETAILED DESCRIPTION OF VARIOUS EMBODIMENTS

Figure 1:
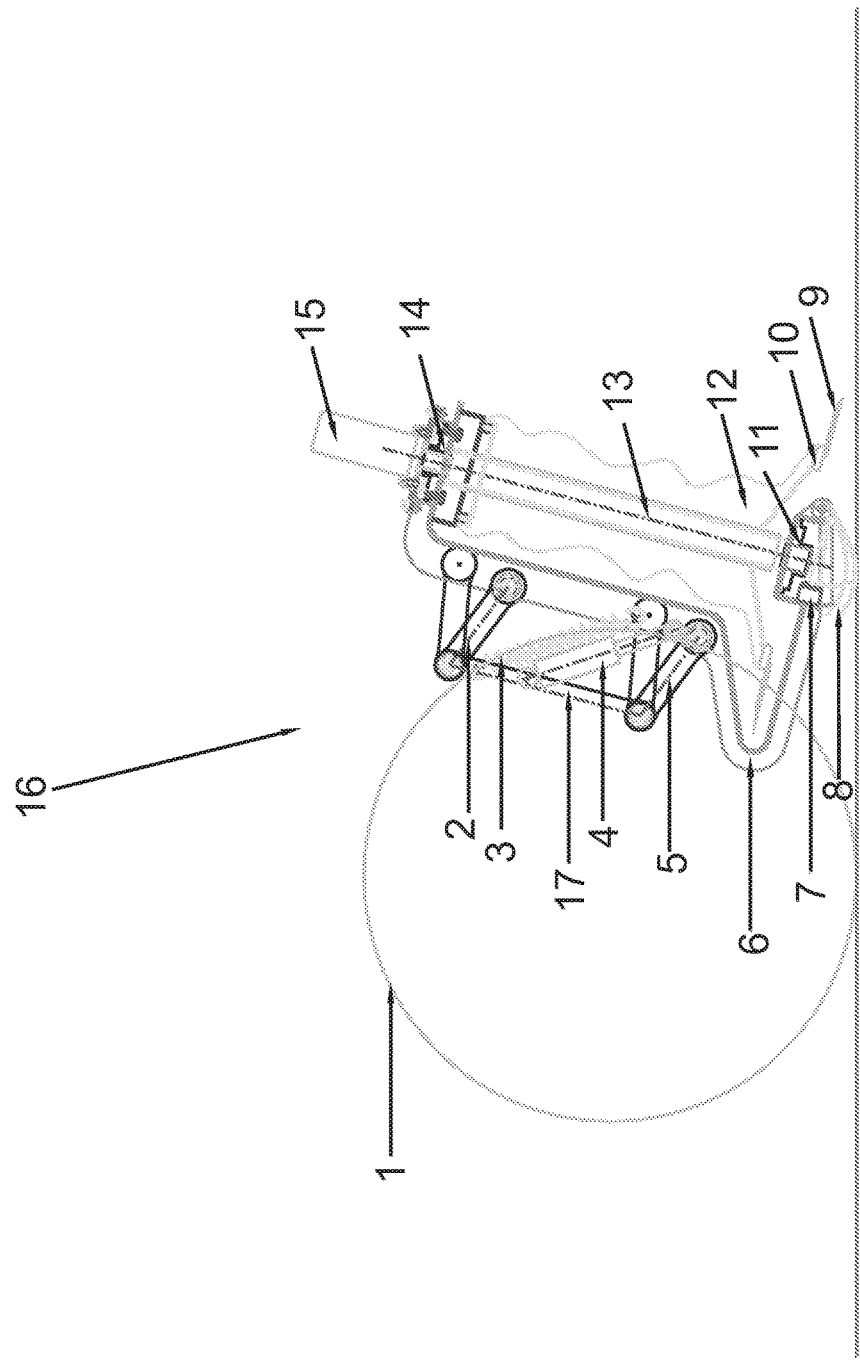
FIG. 1 is a sectional side view of a base-cutter according to the invention.

The figures show a base-cutter assembly 16 of a sugar-cane harvester, wherein one can see schematically the front tire 1 of the harvester. The base-cutter assembly is formed by a pair of base-cutters 16. As the figures show in side view of the assembly, only one of the base-cutters is visible.

As shown in the figures, the base-cutter 16 comprises an axle or tube 13 coupled to a drive engine, illustrated schematically with reference number 15. Close to the engine 15, the drive shaft or tube passes through the bearing assembly 14.

On the axle 13 a turning component is mounted, which is provided with spaced-apart lugs 12 responsible for guiding the cut sugar-cane into the harvester, where it will be further processed. For cutting the cane, the driving axle 13 comprises a turning disc 10 with knives 9 mounted on its lower portion.

The lower part of the axle 13 also comprises a bearing assembly 11, which has, at its lower end portion, an inverted-shell-shaped vaulted component 8, which moves as a "ski" close to the ground surface by means of work movement of the harvester.

Between the upper and lower portions of the axle 13, in a region adjacent to the bearings 11, 14, substantially C-shaped support 6 is provided, on which a pair of articulable rods, 2, 5 linked to an arm 17 is mounted. An adjustable-action spring 3 is mounted between two alternating articulation points of the rods 2, 5. A hydraulic/pneumatic cylinder 4 is mounted between the arm 17 and a support C-shaped support region 6.

The adjustable-action spring 3 is sized to alleviate or annul the weight of the base-cutter assembly 16, until the latter remains touching the ground, exerting little pressure on the latter.

Figure 2:
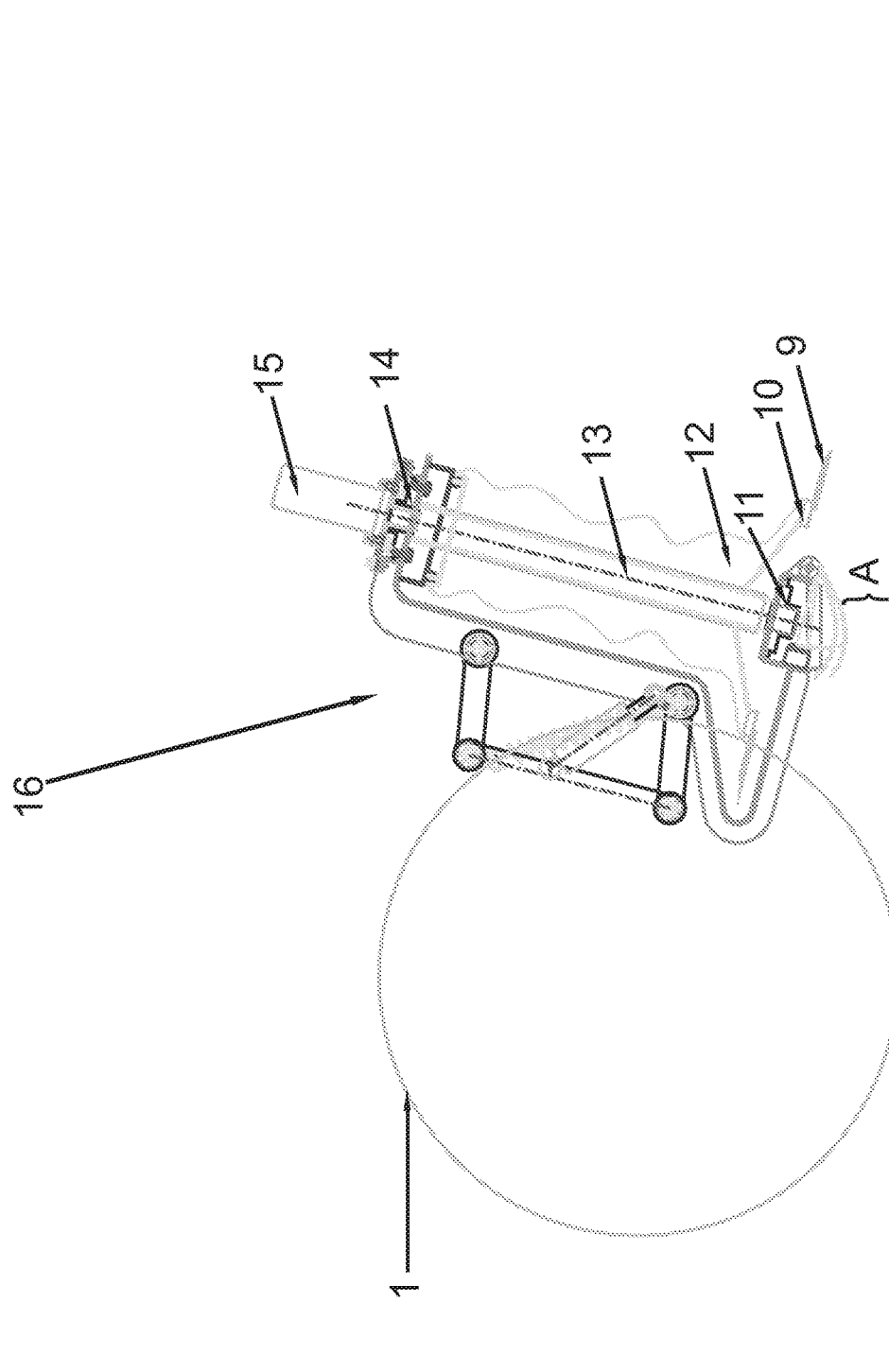
FIG. 2 is a sectional side view of a base-cutter according to the invention, the base-cutter being off-set upward from the ground surface.

According to the invention, the base-cutter assembly 16 should "float" during the harvesting process. For this purpose, the inverted-shell-shaped component 8 acts as an articulated "ski" that rubs the ground in order to detect regularities on the ground. In this way, any alteration in the ground relief will be interpreted as being excess or lack of pressure on the shell or "ski" 8, which will actuate an electric switch 7 that commands the hydraulic/pneumatic cylinder 4. The hydraulic/pneumatic cylinder 4 will cause the base-cutters 16 to go up or down (by movement/articulation of the rods 2, 5) only enough to prevent the knives of the base-cutters 16 from cutting the ground or cutting the cane much above the ideal cutting point. This continually performed process is nothing else than said "floating" of the base-cutters 16. FIG. 2 shows schematically the base-cutter assembly 16 in lifted from the ground by the distance A.

A presented example of embodiment having been described, one should understand that the scope of the present invention embraces other possible variations, being limited only by the contents of the accompanying claims, which include possible equivalents.

The invention claimed is:

1. A floating base-cutter assembly (16) for use on a sugar-cane harvester, the assembly comprising:
two base-cutters, each of the two base-cutters comprising:
a vertical axle (13) having a lower portion and an upper portion;
a bearing assembly comprising a lower bearing (11) positioned adjacent the lower portion of the vertical axle and an upper bearing (14) positioned adjacent the upper portion of the vertical axle;
a C-shaped support (6) having two opposing ends, each of the two opposing ends being mounted adjacent the lower bearing and the upper bearing, respectively;
a pair of articulated rods (2, 5) mounted to a frame of the sugar-cane harvester and to the C-shaped support (6);
an arm (17) linking the pair of articulated rods (2, 5) relative to one another;
an actuator (4) mounted to the arm (17) and a portion of the C-shaped support (6) intermediate the mounting portions for the pair of articulated rods (2, 5) such that the actuator extends between the arm (17) and the portion of the C-shaped support (6) to which the actuator is mounted;
an electric switch (7) mounted adjacent the lower bearing (11) and selectively commanding movement of the actuator (4);
an inverted-shell-shaped component (8) mounted adjacent the lower bearing (11), being in electric contact with the electric switch (7), and being in physical contact with a ground surface adjacent the sugar cane harvester; and
an adjustable set of cutting knives (9) connected to the vertical axle (13),
wherein:
a change in pressure exerted on the inverted-shell-shaped component (8) by the ground surface actuates the electric switch (7);
the commanded movement of the actuator (4) via the actuated electric switch (7) imposes movement of the articulated rods (2, 5) that vertically moves the base-cutters (16) and adjusts a position of the adjustable set of cutting knives (9) relative to the ground surface such that, despite variations in the ground surface, the set of cutting knives (9) remains always at a predetermined distance from and do not contact the ground surface.

2. The base-cutter assembly according to claim 1, wherein the actuator (4) is a hydraulic/pneumatic cylinder (4) such that movement of the hydraulic/pneumatic cylinder (4) articulates the set of rods (2, 5).

3. The base-cutter assembly according to claim 1, wherein:
each of the each of the base-cutters further comprises a traction spring (3) mounted between two alternating articulation points of the upper and lower articulated rods (2, 5);
the adjustable distance of the cutting knives (9) with respect to the ground is further provided via the traction spring (3), which is configured to either alleviate or annul the weight of the base-cutter assembly (16).

4. The base-cutter assembly according to claim 1, wherein:
the vertical axle comprises a turning disc (10); and
the set of cutting knives (9) are mounted on a lower portion of the turning disc.

* * * * *